United States Patent [19]

Takeshima et al.

[11] Patent Number: 5,229,931
[45] Date of Patent: Jul. 20, 1993

[54] NUT RUNNER CONTROL SYSTEM AND METHOD OF MONITORING NUT RUNNERS

[75] Inventors: Akira Takeshima; Akihiko Takahashi; Shigeo Kobayashi; Yasuto Watanabe; Toshikazu Asakura; Hisaya Watanabe, all of Sayama, Japan

[73] Assignee: Honda Giken Kogyo Kabushiki Kaisha, Tokyo, Japan

[21] Appl. No.: 872,981

[22] Filed: Apr. 24, 1992

Related U.S. Application Data

[63] Continuation of Ser. No. 409,308, Sep. 19, 1989, abandoned.

[30] Foreign Application Priority Data

| Sep. 21, 1988 | [JP] | Japan | 63-238592 |
| Sep. 22, 1988 | [JP] | Japan | 63-239150 |
| Sep. 22, 1988 | [JP] | Japan | 63-239151 |

[51] Int. Cl.$^5$ .............................. G06F 15/46
[52] U.S. Cl. ..................... 364/133; 364/131; 364/136; 364/474.11; 81/467
[58] Field of Search ........... 364/133, 131, 136, 474.11, 364/468, 474.02, 508; 51/165.71, 165.72; 29/407, 446; 81/467, 469, 57.22

[56] References Cited

U.S. PATENT DOCUMENTS

| 4,510,424 | 4/1985 | Doniwa | 318/432 |
| 4,580,085 | 4/1986 | Eto et al. | 364/184 |
| 4,581,812 | 4/1986 | Yamanaga et al. | 81/57.22 |
| 4,620,450 | 11/1986 | Yamaguchi | 73/862.23 |
| 4,841,431 | 6/1989 | Takagi et al. | 364/474.11 |
| 4,894,767 | 1/1990 | Doniwa | 364/153 |
| 4,908,926 | 3/1990 | Takeshima | 29/407 |
| 4,959,797 | 9/1990 | McIntosh | 364/508 |
| 4,969,105 | 11/1990 | Gaenssle | 364/508 |

FOREIGN PATENT DOCUMENTS

| 0171058 | 2/1986 | European Pat. Off. |
| 0253082 | 1/1988 | European Pat. Off. |
| 0269907 | 6/1988 | European Pat. Off. |
| 0272397 | 6/1988 | European Pat. Off. |
| 0281416 | 9/1988 | European Pat. Off. |
| 55-18349 | 2/1980 | Japan |
| 58-66672 | 4/1983 | Japan |
| 59-118380 | 7/1984 | Japan |
| 61-50777 | 3/1986 | Japan |
| 1196812 | 3/1984 | U.S.S.R. |
| 1578232 | 3/1977 | United Kingdom |
| 1591355 | 8/1977 | United Kingdom |
| 2006963 | 10/1978 | United Kingdom |
| 2148551 | 5/1985 | United Kingdom |
| 2161622 | 1/1986 | United Kingdom |
| 2196756 | 5/1988 | United Kingdom |

OTHER PUBLICATIONS

Examiner's Report to the Comptroller Under Section 17 (The Search Report), UK Appln. No. 8921261.7, Jun. 29, 1990.

*Primary Examiner*—Jerry Smith
*Assistant Examiner*—Paul Gordon
*Attorney, Agent, or Firm*—Birch, Stewart, Kolasch & Birch

[57] ABSTRACT

A nut runner control system includes a plurality of nut runners, a plurality of subcontrollers connected to the nut runners, respectively, for controlling the nut runners, and a master controller connected to the subcontrollers for presetting and modifying drive conditions for the nut runners and for monitoring the nut runners based on data indicating operating conditions of the nut runners and received through the subcontrollers, respectively.

6 Claims, 18 Drawing Sheets

FIG.4(a)

```
SYSTEM PARAMETERS              SHAFT NO. 1

SHAFT REGISTERTION             (REGISTERED)
PRESET LIMIT TORQUE            (10.0)         (kgf-m)

LIMIT TIME FOR CONTINUOUS-MOTOR OPERATION    (20.00)  (sec)
CLUTCH TORQUE                                (0.80)   (kgf-m)
ACCELERATION TIME                            (0.20)   (sec)
BACKLASH TIME                              ±(0.20)    (A)
LIMIT FOR MOTOR OVERCURRENT                  (10.00)
LIMIT TIME FOR MOTOR OVERCURRENT             (0.30)   (sec)
```

FIG.4(b)

PRESET VALUES    SHAFT NO. 1

| | |
|---|---|
| USE OF PROGRAM, PRESET VALUES | (USE) |
| TIGHTENING DIRECTION | (RIGHTHAND) |
| PRELIMINARY TIGHTENING TORQUE | (10.00) (kgf-m) |
| FINAL TORQUE | (10.00) (kgf-m) |
| UPPER LIMIT FOR FINAL TORQUE | (10.00) (kgf-m) |
| LOWER LIMIT FOR FINAL TORQUE | (9.70) (kgf-m) |
| SNUG TORQUE | (1.40) (kgf-m) |
| LIMIT TIME FOR CONTINUOUS MOTOR OPERATION | (20.0) (sec) |
| MAX. TIGHTENING TIME | (1.5) (sec) |
| MIN. TIGHTENING TIME | (0.7) (sec) |
| BRAKE SPEED FOR FINAL TIGHTENING | (30) (%) |
| BRAKE TIMING FOR FINAL TIGHTENING | (100) (%) |

FIG.4(c)

| PROGRAM | SHAFT NO. 1 | | | |
|---|---|---|---|---|
| ☐ 1. (IDLE) | (1 0 0) rpm | (1. 0) sec | | |
| 2. (INTERLOCK ) | (1) | (0) sec | | |
| 3. (SLOW START) | (1 0) rpm | (1. 0) sec | (ON) | |
| 4. (HIGH SPEED) | (5 0 0) rpm | | | |
| 5. (MEDIUM SPEED) | (1 0 0) rpm | | | |
| 6. (INTERLOCK ) | (5) | (1 0) | | |
| 7. (TIGHTEN) | (3 0) rpm | (ON) | (0. 0 0) sec | |
| 8. (RESULT) | (TORQUE) | (TIME) | ( LS ) | |
| 9. (END ) | | | | |

OK/NG MONITOR

| | Gr | OK | NG | AL | PRESET TORQUE | TIGHTENING TORQUE | TIME | REMARKS |
|---|---|---|---|---|---|---|---|---|
| 1 | 1 | ▨ | | | 10.00 | 10.08 | 0.80 | |
| 2 | 1 | ▨ | | | 10.00 | 10.12 | 0.78 | |
| 3 | 1 | ▨ | | | 10.00 | 10.01 | 0.83 | |
| 4 | 1 | ▨ | | | 10.00 | 10.15 | 0.77 | |
| 5 | 2 | | ■ | | 10.00 | 10.40 | 0.35 | |
| 6 | 2 | ▨ | | | 10.00 | 10.03 | 0.86 | |
| 7 | 2 | ▨ | | | 10.00 | 10.11 | 0.74 | |
| 8 | 2 | ▨ | | | 10.00 | 10.00 | 0.89 | |
| 9 | 3 | | ■ | | 8.00 | 8.00 | 1.05 | |
| 10 | 3 | ▨ | | | 8.00 | 8.02 | 0.61 | |
| 11 | 3 | ▨ | | | 8.00 | 8.06 | 0.60 | |
| 12 | 3 | ▨ | | | 8.00 | 8.09 | 0.65 | |
| 13 | 4 | ▨ | | | 10.00 | 10.21 | 0.89 | |
| 14 | 4 | ▨ | | | 10.00 | 10.05 | 0.86 | |
| 15 | 4 | ▨ | | | 10.00 | 10.10 | 0.87 | |
| 16 | 4 | ▨ | | | 10.00 | 10.01 | 0.79 | |

| SHAFT NO. | RESULT | | PRESET TORQUE (kg f—m) | TIGHTENING TORQUE (kg f—m) |
|---|---|---|---|---|
| 1 | ○ | OK | 10.00 | 10.08 |
| 2 | ○ | OK | 10.00 | 10.12 |
| 3 | ○ | OK | 10.00 | 10.01 |
| 4 | ○ | OK | 10.00 | 10.15 |
| 5 | ● | NG | 10.00 | 10.40 |
| 6 | ○ | OK | 10.00 | 10.03 |
| 7 | ○ | OK | 10.00 | 10.11 |
| 8 | ○ | OK | 10.00 | 10.00 |
| 9 | ● | NG | 8.00 | 8.00 |
| 10 | ○ | OK | 8.00 | 8.02 |
| 11 | ○ | OK | 8.00 | 8.06 |
| 12 | ○ | OK | 8.00 | 8.09 |
| 13 | ○ | OK | 10.00 | 10.21 |
| 14 | ○ | OK | 10.00 | 10.05 |
| 15 | ○ | OK | 10.00 | 10.10 |
| 16 | ○ | OK | 10.00 | 10.01 |

VEHICLE BODY SERIAL NO.
VEHICLE MODEL

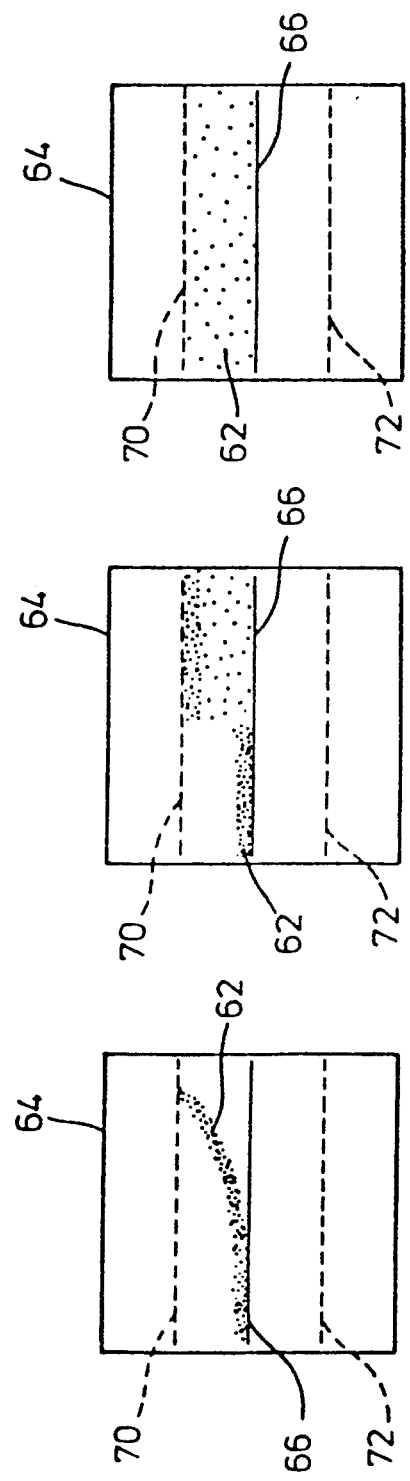

NUT RUNNER CONTROL SYSTEM AND METHOD OF MONITORING NUT RUNNERS

This application is a continuation of copending application Ser. No. 07/409,308, filed on Sep. 19, 1989 and now abandoned, the entire contents of which are hereby incorporated by reference.

BACKGROUND OF THE INVENTION

1. Field of the Invention

The present invention relates to a nut runner control system and a method of monitoring nut runners, and more particularly to a nut runner control system and a method of monitoring nut runners such that drive conditions for the nut runners are set up and modified by a master controller, the nut runners are controlled through subcontrollers, respectively, and operating conditions of the nut runners are monitored by the master controller through the subcontrollers.

2. Description of Related Art

The assembly process for various industrial products such as automobiles is more and more automated to meet increased efficiency and labor saving requirements. For example, some threaded parts such as bolts, nuts, or the like are automatically fastened by a system of nut runners.

Japanese Laid-Open Patent Publication No. 58(1983)-66672 discloses a system comprising a plurality of nut runners for tightening threaded parts. In order to prevent the fastening torques of the nut runners from varying from each other, torque preset means for the respective nut runners preset preliminary torques smaller than desired tightening torques, and when the tightening torques have reached the preliminary torques, the nut runners are temporarily stopped, and then the nut runners are operated again to tighten the threaded parts with the desired tightening torques after elapse of a certain period of time.

If the preset preliminary torques are to be changed, however, they have to be modified for the respective nut runners. It has been quite tedious and time-consuming to preset and modify the drive conditions for the respective nut runners.

In the nut runner control system, it is desirable to monitor the conditions of how the threaded parts are tightened by the nut runners and how the nut runners are operating, so that any trouble will be prevented from occurring and repairs will quickly be carried out should a problem happen.

For example, Japanese Laid-Open Patent Publication No. 55(1980)-18349 shows a system in which the period of time from the start of a tightening process of a nut runner to the time at which the tightening torque has reached a prescribed torque is measured to determine whether the threaded part has been successfully tightened or not. Japanese Laid-Open Patent Publication No. 59(1984)-118380 discloses a system in which the rotational angle and tightening torque of a nut runner are detected and compared with preset angle and torque data to determine whether the tightening process is successful or not.

The process of determining whether a threaded part has been tightened as desired in these disclosed systems works well only when the nut runner and its associated devices operate normally, but cannot determine any tightening failures resulting from malfunctions of the nut runner itself and its associated devices. Therefore, when such a tightening failure happens, the cause of the tightening failure cannot be found. As a result, a number of nut runners cannot efficiently be operated in a production line based on the conventional control system.

SUMMARY OF THE INVENTION

It is a primary object of the present invention to provide a nut runner control system and a method of monitoring nut runners, which allow drive conditions for the nut runners to be preset and modified with utmost ease, prevent the nut runners from having troubles, and permit quick repairs when any of the nut runners suffers from a problem.

Another object of the present invention is to provide a nut runner control system comprising a plurality of nut runners, a plurality of subcontrollers connected to the nut runners, respectively, for controlling the nut runners, and a master controller connected to the subcontrollers for presetting and modifying drive conditions for the nut runners and for monitoring the nut runners based on data indicating operating conditions of the nut runners and received through the subcontrollers, respectively.

Still another object of the present invention is to provide a nut runner control system wherein each of the subcontrollers comprises at least one of rotational speed detecting means for detecting the rotational speed of an output shaft of one of the nut runners, current detecting means for detecting a current supplied to drive the nut runner, and torque detecting means for detecting a torque produced by the output shaft, the subcontroller having means for transferring data detected by at least one of the means as the data indicating operating conditions to the master controller.

Yet another object of the present invention is to provide a nut runner control system wherein the master controller comprises a control panel for presetting and modifying the drive conditions for the nut runners and for displaying the data indicating operating conditions.

A further object of the present invention is to provide a method of monitoring a nut runner, comprising the steps of detecting at least one of the rotational speed of an output shaft of the nut runner, a current supplied to drive the nut runner, and a torque produced by the output shaft of the nut runner, and comparing a pattern of time-dependent changes in the detected data with a pattern of time-dependent changes in data which are produced when a threaded part is normally tightened by the nut runner, thereby determining conditions of the nut runner and the threaded part.

A still further object of the present invention is to provide a method wherein the conditions include conditions of a drive mechanism and a data detector of the nut runner, and tightened condition of the threaded part.

A yet further object of the present invention is to provide a method of monitoring conditions of a nut runner and a workpiece based on a torque with which a threaded part is tightened on the workpiece by the nut runner, the method comprising the steps of measuring and recording the torque with which the threaded part is tightened, and comparing a time-dependent change in the torque with a preset value thereby to monitor the conditions of the nut runner and the workpiece.

A yet still further object of the present invention is to provide a method wherein the conditions include conditions of a drive mechanism of the nut runner and a tightened condition of the threaded part.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 4(a) through 4(c) are diagrams showing, by way of example, various preset drive conditions, displayed on a control panel shown in FIG. 1, for the nut runner control system;

FIGS. 7(a) and 7(b) are diagrams showing operating conditions and results of nut runners, which are displayed on or output from the control panel;

FIGS. 11(a) through 11(c) are diagrams of torque data indicating various abnormal conditions in the displayed torque value of FIG. 10.

DETAILED DESCRIPTION OF THE PREFERRED EMBODIMENT

Figure 1:
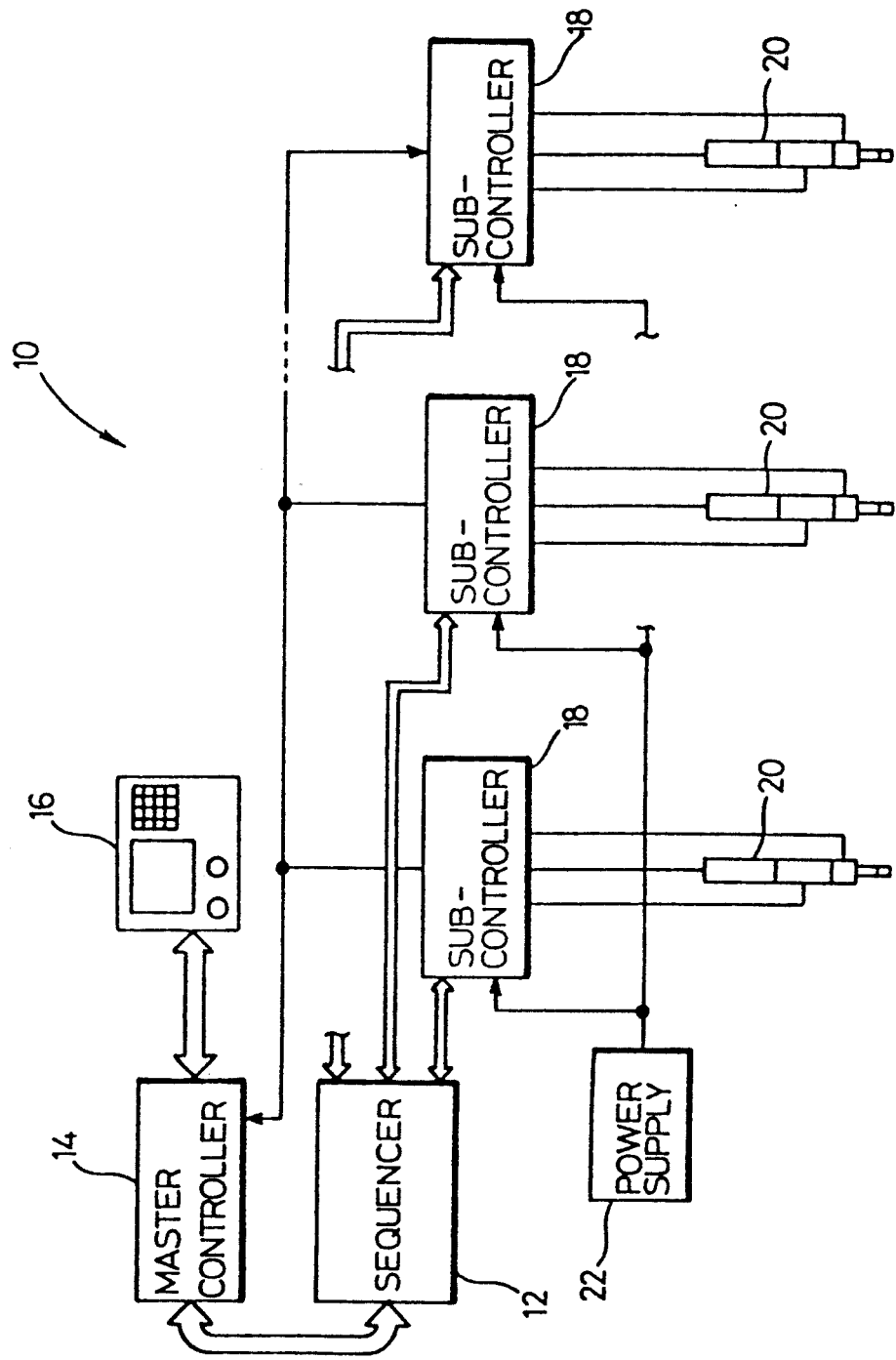
FIG. 1 is a block diagram of a nut runner control system according to the present invention.

FIG. 1 schematically shows a nut runner control system 10 according to the present invention. The nut runner control system 10 basically comprises a sequencer 12, a master controller 14, a control panel 16, a plurality of subcontrollers 18, and a plurality of nut runners 20. The subcontrollers 18 are connected in parallel to the master controller 14.

The sequencer 12 sends operation command signals for the nut runners 20, such as start signals, reset signals, tightening signals, loosening signals, and interlock signals, for example, to the master controller 14, and also sends signals to control the operation of the nut runners 20, such as nonrotation signals, and rotation signals, seating signals, for example, to the subcontrollers 18. The subcontrollers 18 for controlling the nut runners 20 are connected in parallel to the master controller 14. The control panel 16 is connected to the master controller 14 and used to preset and modify a tightening procedure program and tightening torque values, and monitor tightening OK/NG signals and tightening data.

Figure 2:
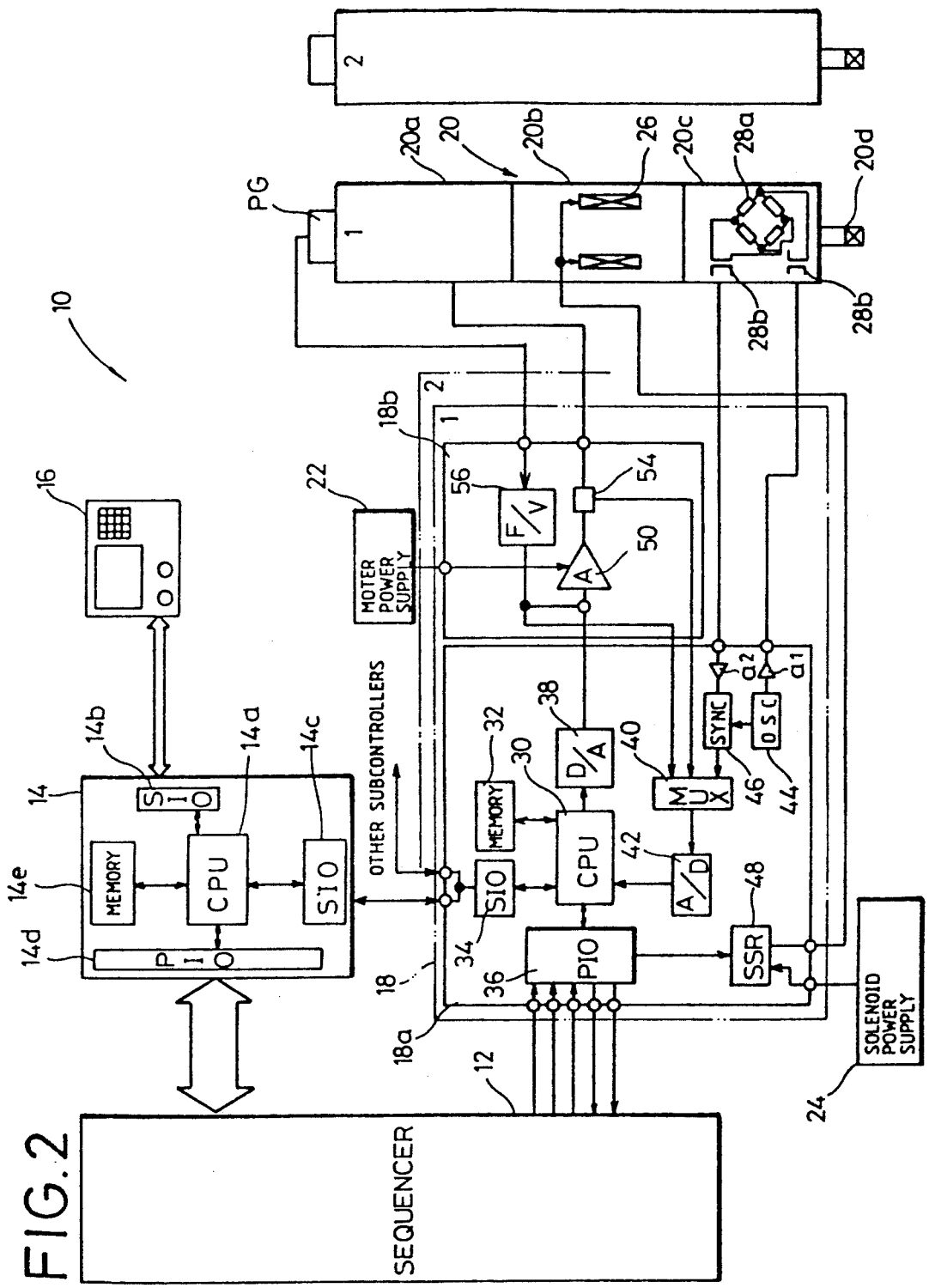
FIG. 2 is a detailed block diagram of the nut runner control system shown in FIG. 1.

As shown in FIG. 2, the master controller 14 comprises a CPU 14a, an SIO 14b for delivering serial data between the control panel 14 and the master controller 14, an SIO 14c for delivering serial data between each of the subcontrollers 18 and the master controller 14, a PIO 14d for delivering parallel data between the sequencer 12 and the master controller 14, and a memory 14e for storing a control program that is preset by the control panel 16 and controls operation of the nut runners 20 through the respective subcontrollers 18, and data on interlock conditions of the nut runners 20. The master controller 14 supplies the sequencer 12 with ready signals, alarm signals, OK signals, NG signals, and interlock signals for the respective nut runners 20 through the PIO 14d.

Each of the subcontrollers 18 includes a controller 18a and a nut runner driver 18b which are electrically connected to one of the nut runners 20. The master controller 14 is supplied with an OK/NG signal indicative of whether a threaded part has successfully been tightened or not by the subcontroller 20, and an interlock signal, from each of the subcontrollers 18. To the subcontroller 18, there are connected a motor power supply 22 for driving the nut runner 20, and a solenoid power supply 24 for changing the rotational speeds of the nut runner 20.

Each nut runner 20 comprises a DC brushless servomotor 20a serving as a drive source, a solenoid unit 20b, a torque detector 20c, and an output shaft 20d. The DC brushless servomotor 20a is associated with a pulse generator PG for detecting the rotational speed of the servomotor 20a. A pulsed signal from the pulse generator PG is applied to the nut runner driver 18b in the subcontroller 18. The solenoid unit 20b has a solenoid 26 which can change the rotational speed of the output shaft 20d to one of a plurality of speed levels by controlling a transmission (not shown). The torque detector 20c has a strain gage 28a for detecting any twist in the output shaft 20d, and supplies the detected strain value to the controller 18a through a rotary transformer 28b.

The controller 18a of the subcontroller 18 comprises a CPU 30 for controlling the nut runner 20, a memory 32 for storing data to be monitored such as a tightening torque for the nut runner 20, the rotational speed of the servomotor 20a, and the current of the servomotor 20a, an SIO 34 for delivering data between the controller 18a and the SIO 14c in the master controller 14, and a PIO 36 for delivering data between the controller 18a and the sequencer 12. The CPU 30 applies a drive signal to the nut runner driver 18b through a D/A converter 38. The CPU 30 also receives monitor data which have been selected by a multiplexer 40 and converted to a digital signal by an A/D converter 42, and stores the digital signal in the memory 32. The multiplexer 40 is supplied with the monitor data, i.e., the motor speed and the motor current from the nut runner driver 18b, and also with the tightening torque from the torque detector 20c through a detecting circuit. The detecting circuit comprises an oscillator 44 for supplying a carrier voltage to the torque detector 20c through an amplifier a1 and a synchronous detector 46 for receiving a strain signal through an amplifier a2 to extract a torque signal. The controller 18a also has a switch 48 such as an SSR (Solid-Stage Relay) for switching over the solenoid unit 20b. The switch 48 is connected to the solenoid power supply 24 and the PIO 36 which outputs a control signal.

The nut runner driver 18b has a servoamplifier 50 which controls the DC brushless servomotor 20a according to a drive signal from the controller 18a. An output signal from the servoamplifier 50 is detected by a current sensor 54, and supplied as motor current data to the multiplexer 40 in the controller 18a. The nut runner driver 18b also has an F/V converter 56 which supplies speed data of the DC brushless servomotor 20a detected by the pulse generator PG as a voltage signal to the multiplexer 40.

The nut runner control system according to the present invention is basically constructed as described above. Operation and advantages of the nut runner control system will be described below.

Figure 3:
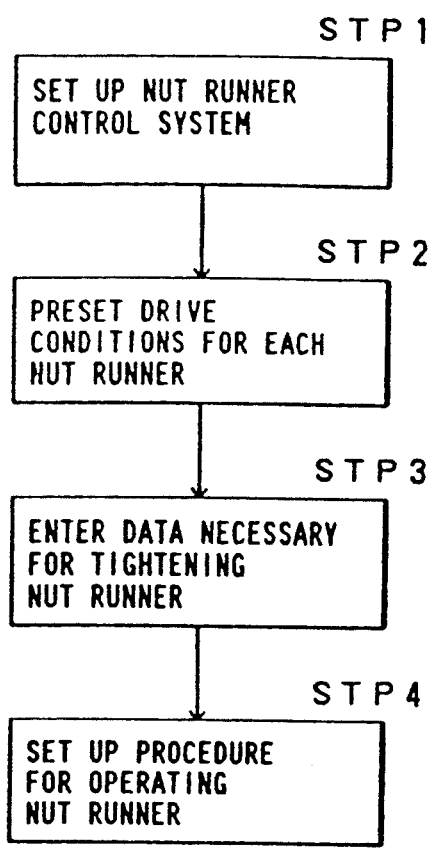
FIG. 3 is a flowchart of a process for initializing the nut runner control system shown in FIG. 1.

A process for initializing the nut runner control system will be described below with reference to FIG. 3.

A desired system arrangement for the nut runner control system 10 is first set up using the control panel 16 in a step 1. For example, the number of shafts or nut runners 20 to be operated is set up. Then, drive conditions for each of the nut runners 20 to be operated are preset in a step 2. For example, an upper limit torque for the tightening torque of the nut runner 20, an upper limit time in which to continuously rotate the DC brushless servomotor 20a of the nut runner 20, a limit value for an overcurrent of the servomotor 20a, an acceleration time in which the servomotor 20a should reach a predetermined motor speed, and other drive conditions are preset (see FIG. 4(a)).

Then, data necessary for tightening a threaded part with each nut runner 20 to be operated are entered in a step 3. For example, there are entered a final tightening torque, a lower limit torque for the final tightening torque, a snug torque which is a torque applied at the end of a medium-speed operation of the nut runner, a limit time in which to continuously rotate the DC brushless servomotor 20a, maximum and minimum times required to tighten a threaded part, a reverse brake rotational speed upon final tightening, and a reverse brakestart timing upon final tightening (see FIG. 4(b)).

After the various data have been entered as described above, a procedure for actually operating each nut runner 20 is set up in a step 4. For example, as shown in FIG. 4(c), an idling mode before a tightening process, including the threading of a bolt into a workpiece hole, picking up of a nut, etc., and a rotational speed and time for the idling process are preset. Thereafter, an interlock mode for synchronizing the nut runner 20 with the other nut runner 20 and other robots such as assembling robots (not shown) is set up. A slow start mode for rotating the nut runner 20 at a low speed so that a nut or the like can smoothly be threaded over a workpiece bolt at the start of a tightening process is set up. Then, a high-speed mode in which the solenoid unit 20b in the nut runner 20 is to be energized to shift the transmission into a high-speed position to rotate output shaft 20d at a high speed, and a rotational speed for the high-speed mode are set up. A medium-speed mode in which the solenoid unit 20b is deenergized to shift the transmission into a medium speed position to rotate the output shaft 20d at a medium speed until a snug torque is reached, and a rotational speed for the medium-speed mode are set up. Then, in order to tighten the nuts simultaneously with the nut runners 20, an interlock mode for synchronizing the nut runners 20 is set up. A tightening rotational speed, a mode for applying a reverse brake when increasing the torque, and a time for carrying out such a reverse brake mode are set up. Finally, there is set up a mode in which the tightening data are determined based on the preset values, and displayed on the screen of the control panel 16 and sent to the sequencer 12. That is, a process is set up to determine whether a final tightening torque is to be determined or not, a tightening torque is to be determined or not, and the nut is seated or not. Then the end of the program is entered, thus completing the setup procedure.

The data and program which have been set up for each nut runner 20 through the control panel 16 are delivered through the SIO 14b and stored in the memory 14e in the master controller 14, and also delivered through the SIOs 14c, 34 and stored in the memories 32 in the subcontrollers 18 corresponding to the respective nut runners 20. Thereafter, a start signal is applied by the sequencer 12 to the master controller 14 and also to each of the subcontrollers 18, which then start executing the program.

In response to the start signal, each subcontroller 18 first executes the idling mode for picking up a nut. More specifically, the CPU 30 in the subcontroller 18 outputs an idling control signal through the PIO 36 to the switch 48 based on the data and program stored in the memory 32. The switch 48 applies a switching signal to the solenoid 26 to enable it to shift the transmission. Then, the CPU 30 applies a drive signal to the servoamplifier 50 in the nut runner driver 18b through the D/A converter 38, and the servoamplifier 50 supplies a drive current to the DC brushless servomotor 20a based on the drive signal. As a result, the output shaft 20d rotates at a prescribed speed for a prescribed period of time to pick up a nut.

After the nut has been picked up, each subcontroller 18 supplies an interlock signal to the master controller 14 to put the nut runner 20 in a standby condition. The interlock signal is stored in the memory 14e in the master controller 14. When the master controller 14 has confirmed that all the subcontrollers 18 are interlocked based on the received interlock signals, the master controller 14 applies an interlock signal to the sequencer 12.

In response to the interlock signal, the sequencer 12 outputs an answer signal to the master controller 14 in the event that each nut runner 20 can start a next mode of operation. When the answer signal is received by the master controller 14, the master controller 14 applies an interlock disable command to all the subcontrollers 18 which have been interlocked.

In response to the interlock disable command from the master controller 14, the subcontrollers 18 then execute a slow start command. More specifically, the CPU 30 in each subcontroller 18 applies a control signal through the PIO 36 to the switch 48 to enable the solenoid 26 in the nut runner 20 to shift the transmission into a slow start position. Then, the CPU 30 applies a drive signal through the D/A converter 38 to the servoamplifier 50 in the nut runner driver 18b. The servoamplifier 50 then energizes the DC brushless servomotor 20a based on the drive signal applied thereto. As a result, the output shaft 20d rotates at a predetermined low speed for a prescribed period of time, thus starting the slow start mode. The nut is then threaded over the workpiece bolt.

The output signal from the servoamplifier 50 is detected by the current sensor 54, and is fed as a motor current, i.e., data to be displayed, through the multiplexer 40, the A/D converter 42, and the CPU 30 and stored in the memory 32 in the controller 18a. The rotational speed of the DC brushless servomotor 20a is detected by the pulse generator PG, converted to a corresponding frequency by the F/V converter 56, and then stored as motor speed data in the memory 32.

Figure 5A:
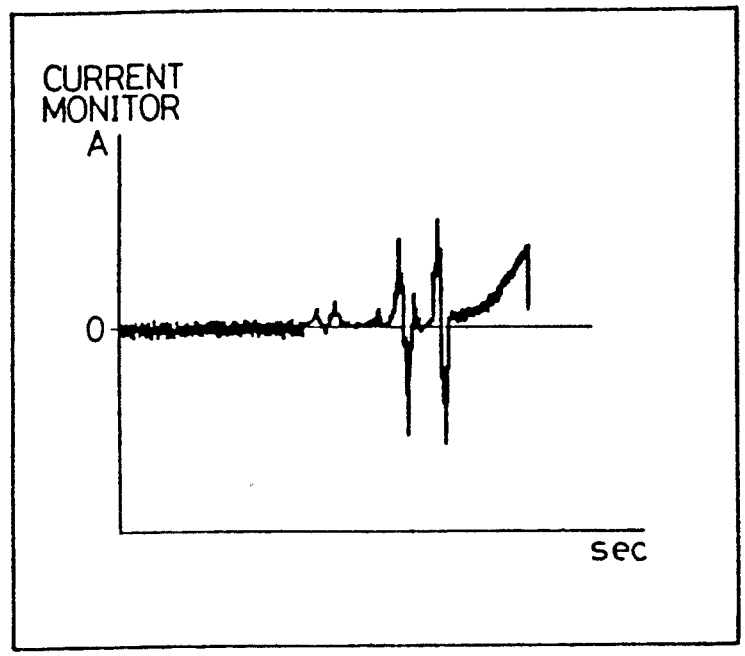
FIG. 5(a) through 5(c) are diagrams showing operating condition data displayed separately on the control panel.
Figure 5B:
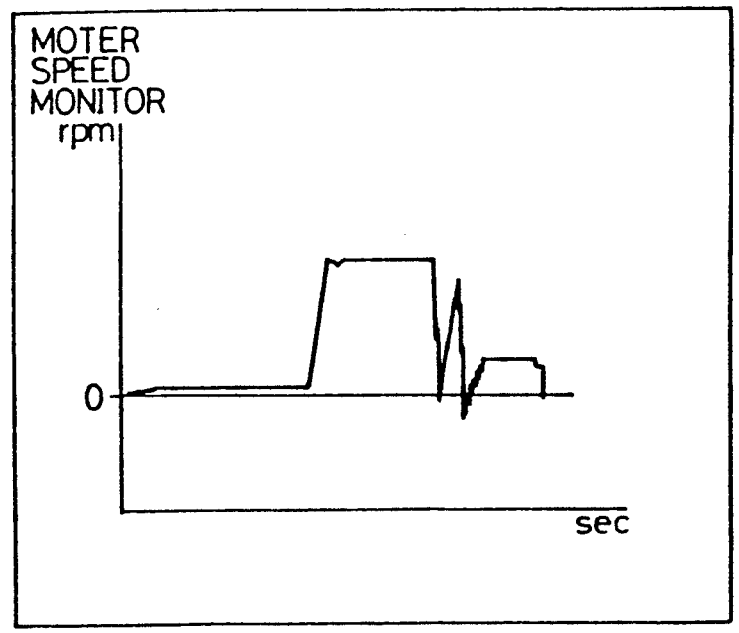
Figure 5:
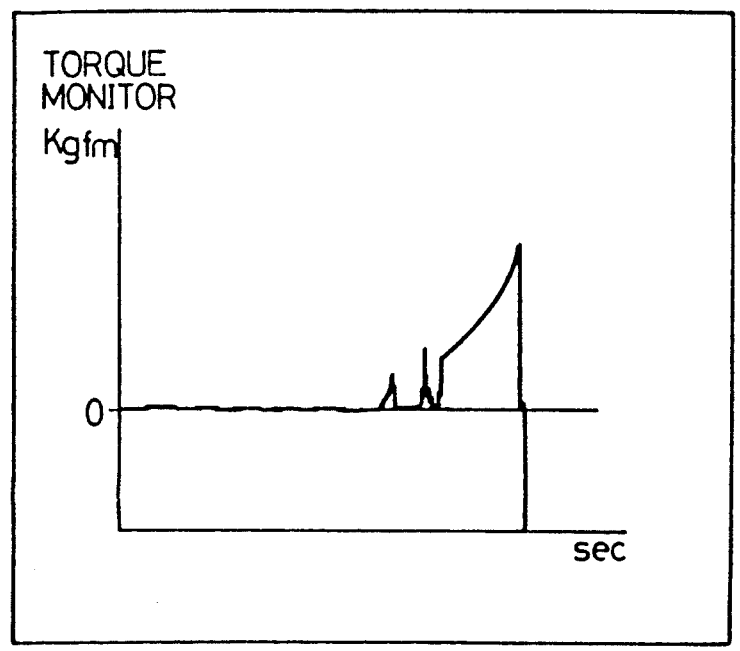

These data to be monitored are then transferred through the SIOs 34, 14c to the master controller 14, and can then be displayed as time-dependent changes on a monitor such as a CRT or the like of the control panel 16. Therefore, the operator can know the operating conditions of the nut runner 20 based on the displayed data. FIGS. 5(a) and 5(b) show by way of example time-dependent changes in the motor current and speed which are displayed on the monitor of the control panel 16.

After the slow start mode of the nut runner 20 is finished, the CPU 30 effects a high-speed nut tightening operation in the nut runner 20. The switch 48 energizes the solenoid 26 to shift the transmission to a high-speed position. The output shaft 20d is then rotated at a high speed based on a drive signal from the CPU 30. The current sensor 54 detects the motor current and transfers its data to the controller 18a. The pulse generator PG also detects the motor speed and transfers its data to the controller 18. The operator can therefore also confirm the operating conditions of the nut runner 20 on the control panel 16 based on the delivered data.

Figure 6:
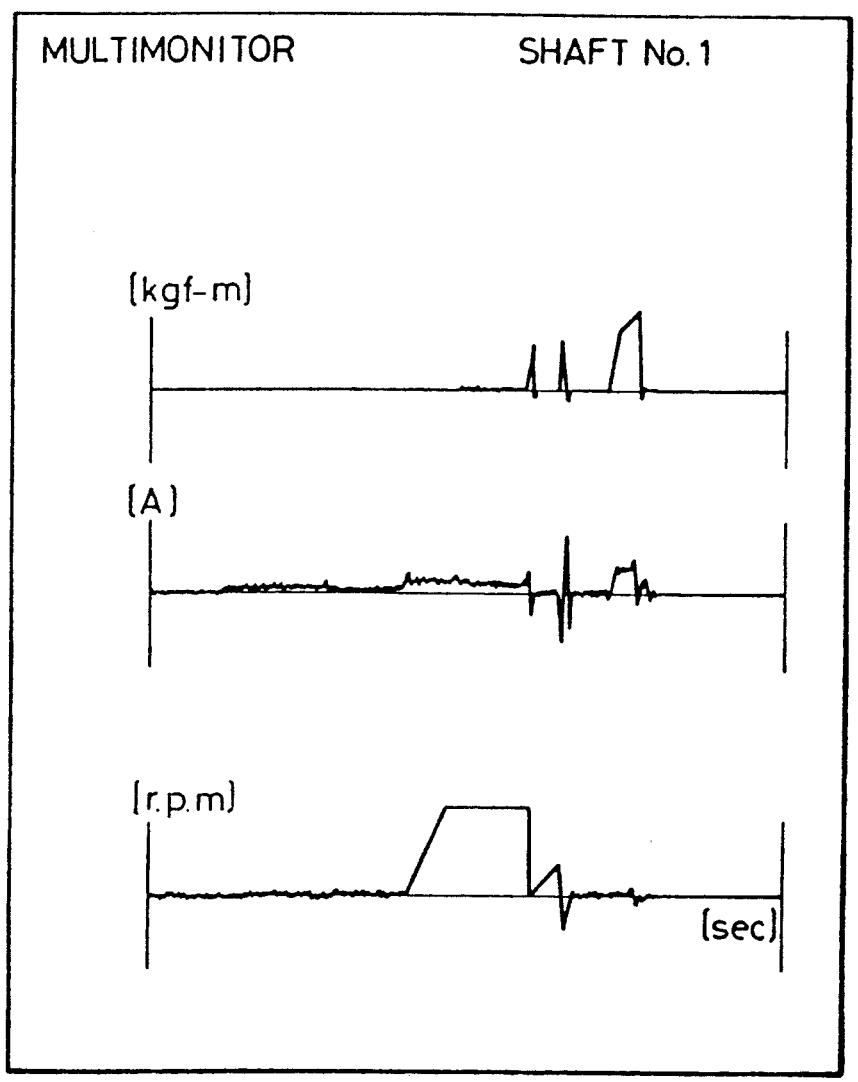
FIG. 6 is a diagram showing operating condition data displayed as a whole on the control panel.

When the DC brushless servomotor 20a is rotated at a high speed, the nut is tightened with respect to the workpiece, and hence a tightening torque is produced on the output shaft 20d. This tightening torque is detected by the strain gage 28a of the torque detector 20c and sent to the detecting circuit in the subcontroller 18. More specifically, the detecting circuit supplies the carrier voltage from the oscillator 44 through the amplifier al to the rotary transformer 28b, and applies a certain voltage to the strain gage 28a. The strain gage 28a detects the twist in the output shaft 20d which is caused by the tightening torque, and supplies the detected twist as a strain signal to the amplifier a2 through the rotary transformer 28b. The strain signal is then applied to the synchronous detector 46 which extracts a torque voltage. The torque voltage is introduced as data to be monitored through the multiplexer 40 and A/D converter 42 into the memory 32 in the subcontroller 18, and applied to the master controller 14 and the control panel 16 for monitoring. FIG. 5(a) shows by way of example time-dependent changes in the torque voltage displayed on the monitor of the control panel 16. The monitor data shown in FIGS. 5(a) through 5(c) may be displayed as a whole on a multimonitor as shown in FIG. 6 so that the relationship between the displayed data can be recognized more clearly.

The torque voltage is compared with a clutch operating torque (see FIG. 4(a)) which is a preset system parameter, by the CPU 30. When the tightening torque represented by the torque voltage has reached the clutch operating torque, the CPU 30 issues a control signal to the switch 48 through the PIO 36. The solenoid 26 is energized to shift the transmission, and the DC brushless motor 20b is slowed down by the nut runner driver 18b. As a result, the output shaft 20d of the nut runner 20 enters the medium-speed mode of operation. The medium-speed mode of operation is continued until the tightening torque detected by the torque detector 20c reaches a preset snug torque.

When the tightening torque has reached the preset snug torque, the CPU 30 applies a shutdown command to the nut runner 20, and also applies an interlock signal to the master controller 14. The master controller 14 receives interlock signals from the respective subcontrollers 18, and stores them in the memory 14e. When the interlock signals have been received from all the subcontrollers 18, the master controller 14 applies an interlock mode disable command to the subcontrollers 18, thus restarting operation of the nut runners 20. The nut runners 20 then simultaneously starts finally tightening the respective nuts on the workpiece.

Based on the interlock mode disabling command applied, the CPU 30 in each of the subcontrollers 18 enables the nut runner driver 18b to drive the nut runner 20, the output shaft 20d of which finally tightens the nut on the workpiece. At this time, the CPU 30 determines whether the nut is successfully tightened or not based on the tightening torque detected by the torque detector 20c. More specifically, the CPU 30 determines whether the tightening torque is of a value between the preset upper and lower limits for final torque (see FIG. 4(b)), whether the final tightening time is of a value between the maximum and minimum tightening times (see FIG. 4(b)), and whether there is an input signal from a limit switch that detects when the nut is seated on the workpiece.

While the nut runners 20 are in operation, the control panel 16 displays OK/NG monitor data on the control panel 16. The displayed data are updated on a real-time basis each time a tightening completion signal or an error alarm signal is issued from the subcontrollers 18. Therefore, the operator can immediately confirm operating conditions of the nut runners 20 and which nut runner 20 is malfunctioning by looking at the OK/NG monitor data. The operator can be provided with a printed list of operating conditions of the nut runners 20, check results, and errors based on torque data, speed data, and current data of the nut runners 20 which are transferred to the control panel 16, as shown in FIG. 7(b).

If a check result indicates NG, then the operator may locate the position where the malfunction has occurred by comparing the time-dependent changes (see FIGS. 5(a) through 5(c) and 6) in the torque data, the motor current data, and the motor speed data displayed on the control panel 16 with normal time-dependent changes in these data.

Each of FIGS. 8(a) through 8(d) shows a pattern of varying speeds of the DC brushless servomotor 20a, a pattern of varying currents flowing through the DC brushless servomotor 20a, and a pattern of varying torques of the output shaft 20d, when an alarm signal or NG signal indicative of an abnormal condition of the nut runner 20 or the tightening process.

Figure 8A:
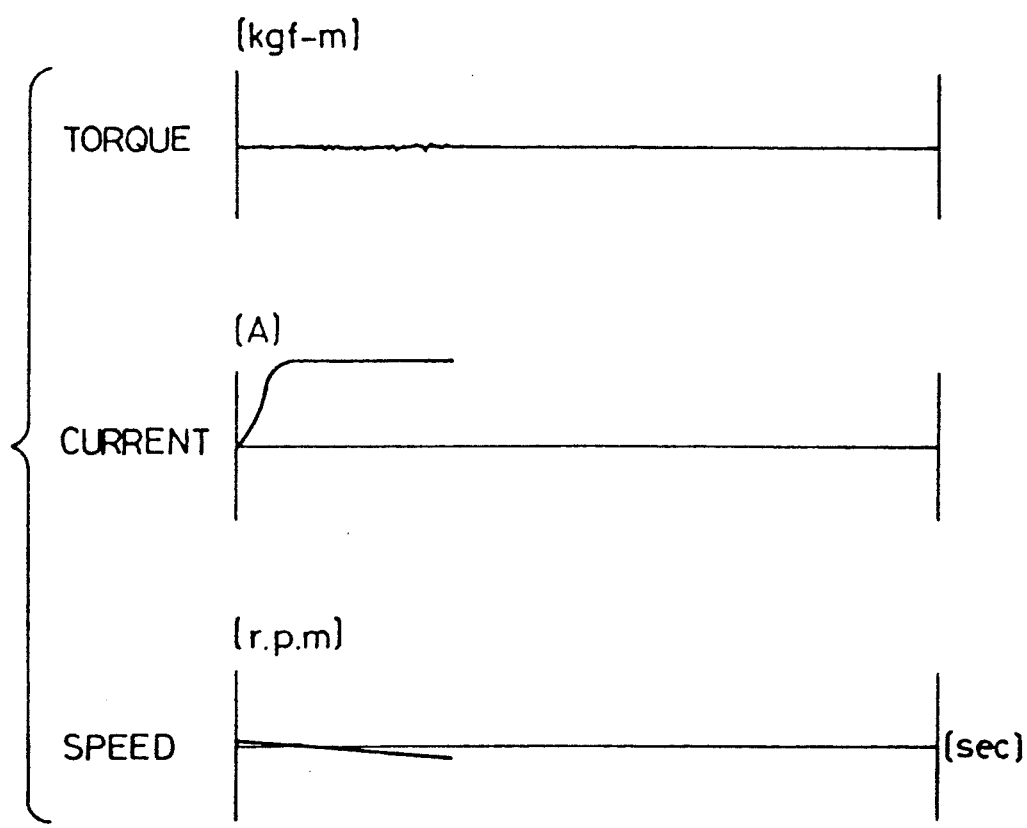
FIGS. 8(a) through 8(d) are diagrams of monitored data indicating various abnormal conditions, which are displayed on the control panel.

FIG. 8(a) indicates that whereas the rotational speed of the motor 20a does not increase, the motor current flows abruptly. The patterns of FIG. 8(a) suggest that the mechanisms (such as gears, the transmission clutch, etc) of the nut runner 20 may be having a problem.

Figure 8B:
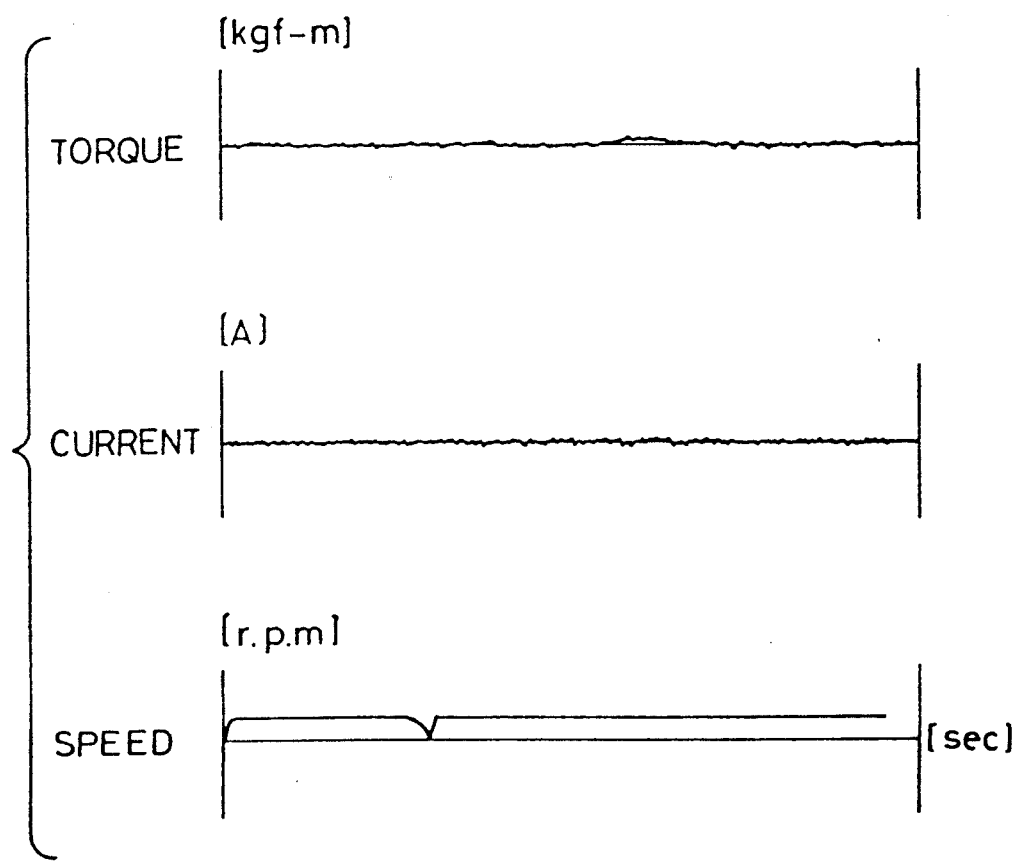

FIG. 8(b) shows that the current remains unchanged but the rotational speed of the motor 20a increases, indicating that a thread of the nut may have been broken, the nut may have been dislodged from the output shaft 20d, or a nut tightening failure may have occurred.

Figure 8C:
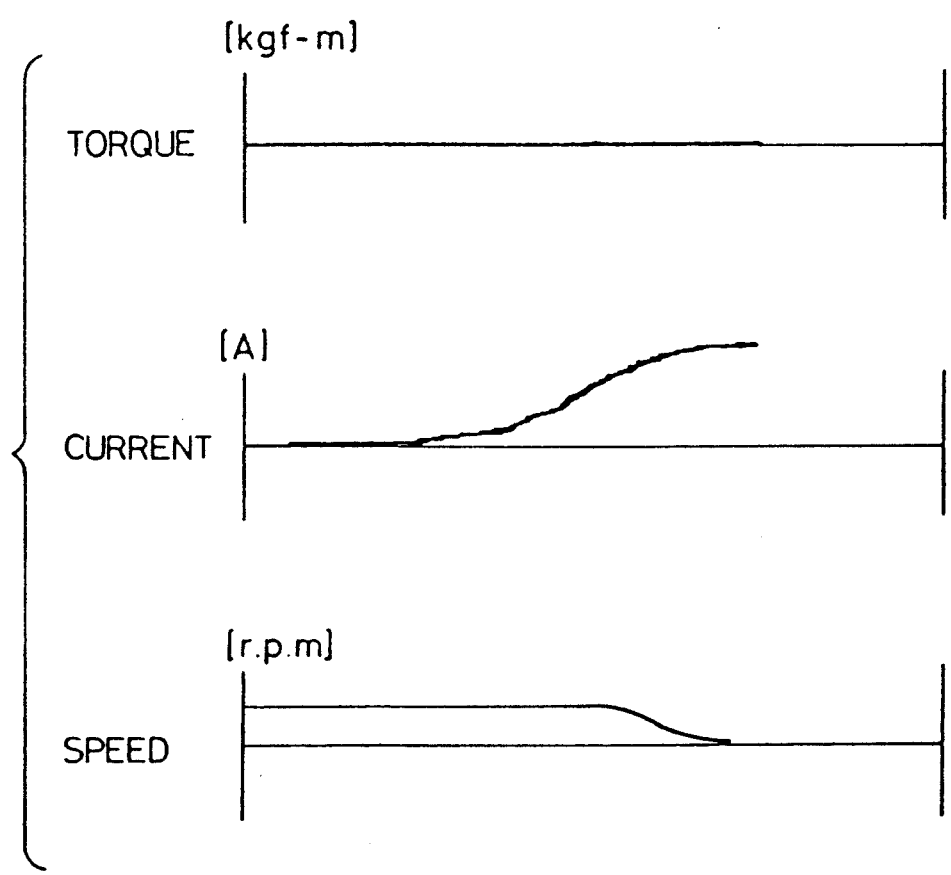

FIG. 8(c) shows that the current and rotational speed change, but no torque variation is seen unlike a normal pattern with which the nut is normally tightened. These patterns suggest that the torque detector may have failed.

Figure 8D:
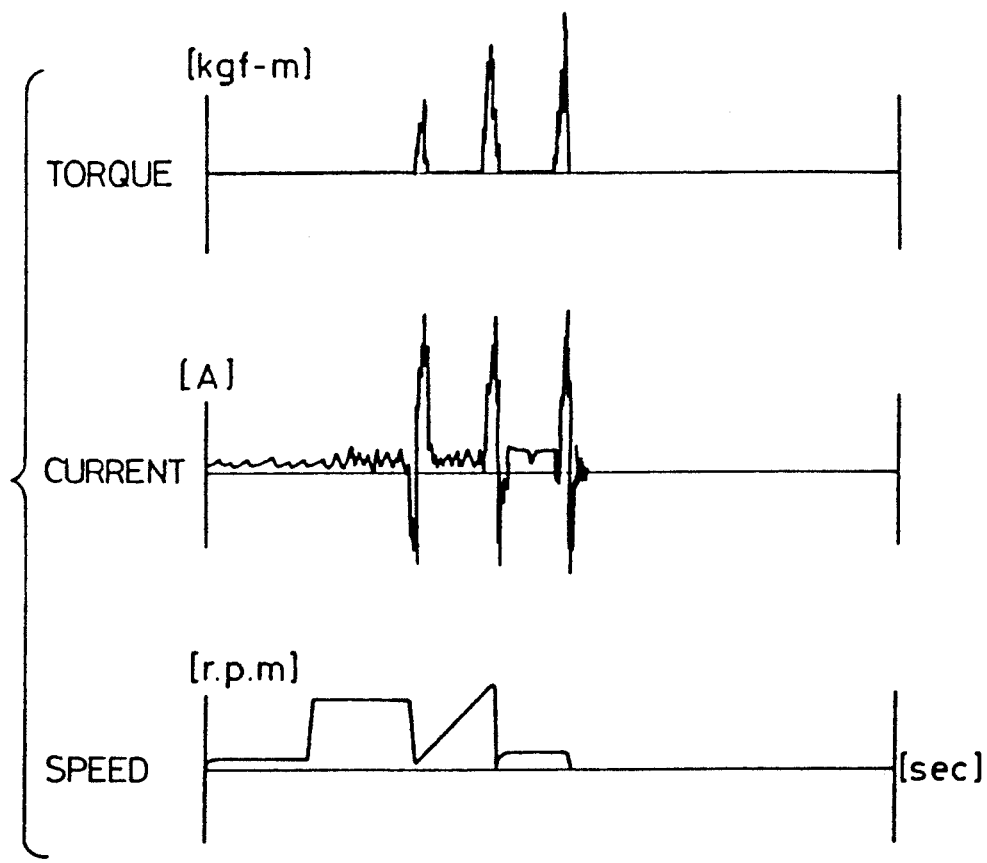

FIG. 8(d) shows that the torque and current abruptly change, indicating a tightening failure. If the rotational speed of the motor has reached a predetermined speed, then the nut may have been jammed or some foreign matter may have entered. If the rotational speed has not reached the predetermined speed, then the rotational speed or the tightening speed may have been preset in error.

Figure 9:
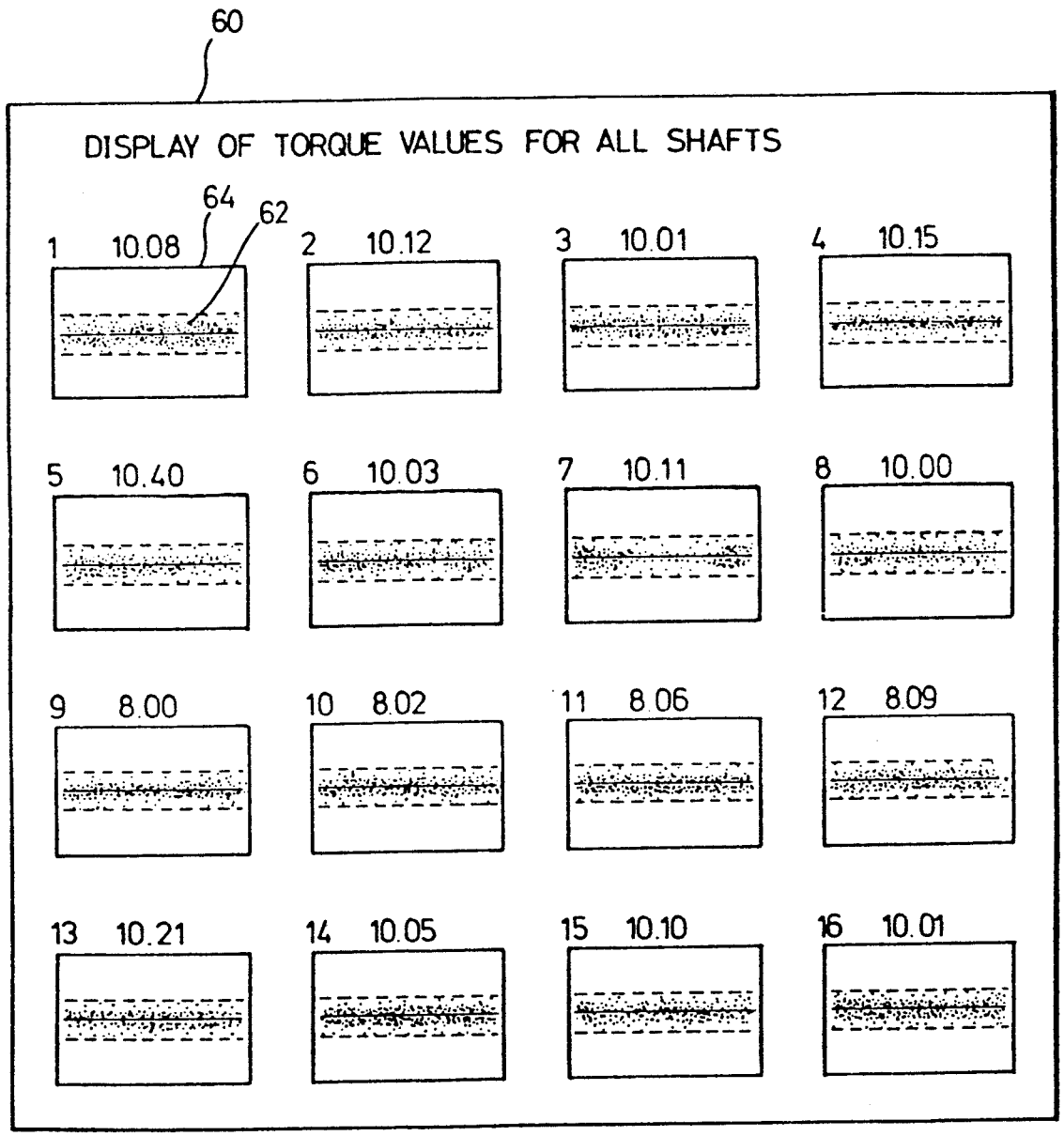
FIG. 9 is a diagram showing torque values for all shafts, displayed on the control panel.
Figure 10:
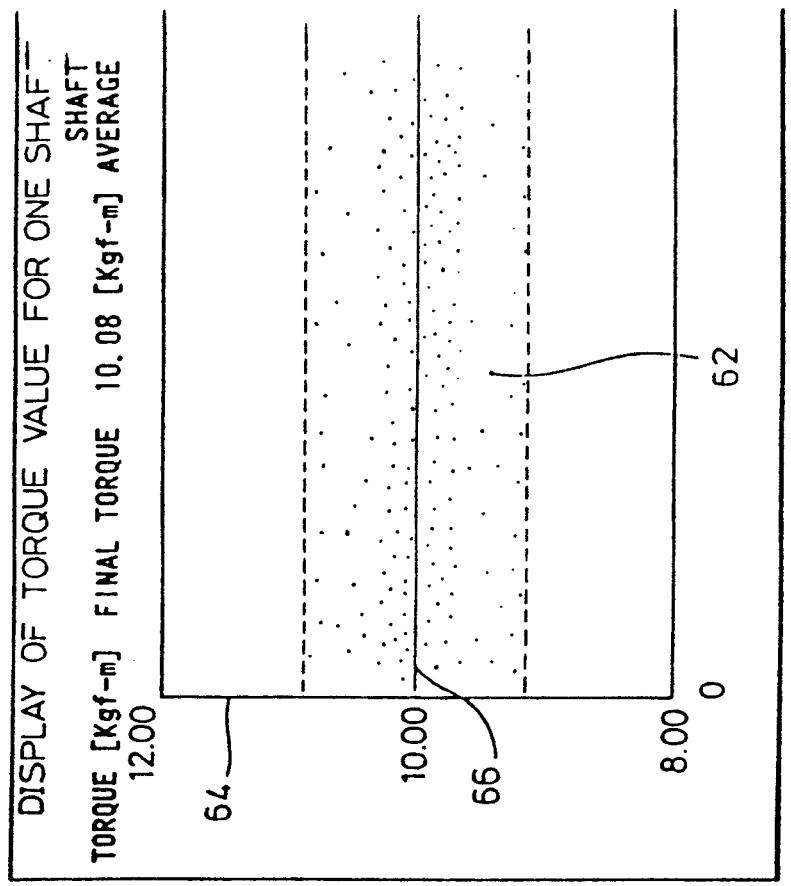
FIG. 10 is a diagram showing a torque value for one shaft, displayed on the control panel.

The tightening torque values stored in the memory 14e in the master controller 14 may be displayed as a torque value chart 60 for all shafts as shown in FIG. 9. The torque value chart 60 displays a combination of torque value charts 64 each for a single shaft, each chart 64 showing a tightening torque value 62 of the nut runner 20 for each nut. The torque value chart 64 for a single shaft can be displayed singly at an enlarged scale as shown in FIG. 10. The torque value chart 64 shows time-dependent changes in the tightening torque 62 plotted with respect to a final torque 66 which has been preset in the step 3 (FIG. 3) through the control pane 16. The torque value chart 64 also includes upper and lower limits 70, 72 for the final torque.

Using the torque value chart 60 for all shafts or the torque value chart 64 for a single shaft, the operator can monitor time-dependent changes in the operating conditions of the respective nut runners 20 or workpiece positioning conditions.

More specifically, if the tightening torque value 62 varies as shown in FIG. 11(a), for example, the operator can recognize in advance that the functions of circuit components of the nut runner 20 have been gradually degraded.

If the tightening torque value 62 is abruptly changed as shown in FIG. 11(b), the operator can know that the workpiece may have been changed or the amplifier a2 may have malfunctioned. A different workpiece may be handled by varying the final torque 66, the upper limit 70 for the final torque, and the lower limit 72 for the final torque.

If the tightening torque value 62 varies between the final torque 66 and the upper limit 70 for the final torque as shown in FIG. 11(c), the preset rotational speed for tightening the nut with the nut runner 20 may have been inappropriate, or the drive power transmitting mechanism of the nut runner 20 may have been malfunctioning. To solve these problems, the preset rotational speed for the nut runner 20 may be varied, or the nut runner 20 may be replaced with another nut runner.

With the present invention, as described above, drive conditions for the nut runners are preset and modified by the master controller, and the nut runners are controlled through the subcontrollers by the master controller. The operating conditions of the subcontrollers are monitored through the master controller at all times. The master controller can control the nut runners as a whole. The drive conditions for the nut runners can quickly and efficiently be varied through the master controller. The nut runner control system of the present invention can therefore be operated with ease.

Since the operating conditions of the nut runners are always monitored through the master controller, the operator can immediately confirm whether the nut runners are being operated normally or not, or whether the nuts or other threaded parts are being tightened properly or not. Accordingly, when any malfunction takes place, such an error can quickly be removed. Defective components are thus prevented from being produced, and the efficiency of production is increased.

Furthermore, at least one of the rotational speed of the drive source for the nut runner, the current flowing through the drive source, and the torque of the output shaft of the nut runner is detected and its data are accumulated, and the accumulated data are output as time-dependent changes. By comparing the above data with a reference level for the rotational speed of the drive source, the current flowing through the drive source, or the torque of the output shaft of the nut runner, the reference level being of a value reached when the threaded part is normally tightened, it is possible to determine a failure of the nut runner itself and a tightening failure resulting from a wrong instruction given to the nut runner, and also to locate the cause of such a failure.

Moreover, a final tightening torque applied by the nut runner is successively measured and measured values are accumulated for each threaded part, and the accumulated final tightening torque values are displayed as time-dependent data for evaluating the conditions of the nut runner or the workpiece. The driven conditions of the nut runner, entry of foreign matter into the workpiece, jamming of the threaded part, or a positioning error thereof can appropriately be determined based on the tendency of the time-dependent changes in the final tightening torque. Troubles can thus be quickly removed or avoided in advance by repairing the nut runner or the workpiece based on the determined result.

Although a certain preferred embodiment has been shown and described, it should be understood that many changes and modifications may be made therein without departing from the scope of the appended claims.

What is claimed is:

1. A nut runner control system comprising:
   a plurality of nut runners;
   a plurality of subcontrollers connected to said nut runners, respectively, for controlling the nut runners; and
   a maser controller connected to said subcontrollers for presetting and modifying drive conditions for said nut runners and for monitoring said nut runners based on data indicating operating conditions of said nut runners and received through said subcontrollers, respectively;
   wherein each of said subcontrollers comprises:
   rotational speed detecting means for detecting the rotational speed of an output shaft of one of said nut runners,
   current detecting means for detecting a current supplied to drive said nut runner,
   torque detecting means for detecting a torque produced by said output shaft, and
   means for transferring data detected by said rotational speed detecting means, said current detecting means and said torque detecting means as said data indicating operating conditions to said master controller.

2. A nut runner control system according to claim 1, wherein said master controller comprises a control panel for presetting and modifying the drive conditions for said nut runners and for displaying said data indicating operating conditions.

3. A method of monitoring a plurality of nut runners, comprising the steps of:
   providing a plurality of nut runners connected, respectively, to subcontrollers for controlling said nut runners;
   setting predetermined drive conditions for said nut runners in said subcontrollers;
   detecting the rotational speed of respective output shafts of said nut runners, a current supplied to drive said nut runners, and torque produced by said respective output shafts of said nut runners; and
   comparing a pattern of time-dependent changes in the detected data with a pattern of time-dependent changes in data which are produced when threaded parts are actually tightened by the nut runners, thereby determining operating conditions of the nut runners and the threaded parts.

4. A method according to claim 3, wherein said conditions include conditions of a drive mechanism and a data detector of the nut runners, and a tightened condition of the threaded parts.

5. A method of monitoring conditions of a plurality of nut runners and a workpiece based on torque with which a plurality of threaded parts are tightened on the workpiece by the nut runners, said method comprising the steps of:

providing a plurality of nut runners connected, respectively, to subcontrollers for controlling said nut runners;

setting predetermined drive conditions for said nut runners in said subcontrollers;

measuring the torques with which the threaded parts are tightened;

recording a plurality of torques with which the threaded parts are tightened over a plurality of tightening cycles; and comparing time-dependent changes in said torques with preset values thereby monitoring operating conditions of the nut runners and the workpiece.

6. A method according to claim 5, wherein said conditions include conditions of a drive mechanism of the nut runners and a tightened condition of the threaded parts.

* * * * *